UNITED STATES PATENT OFFICE.

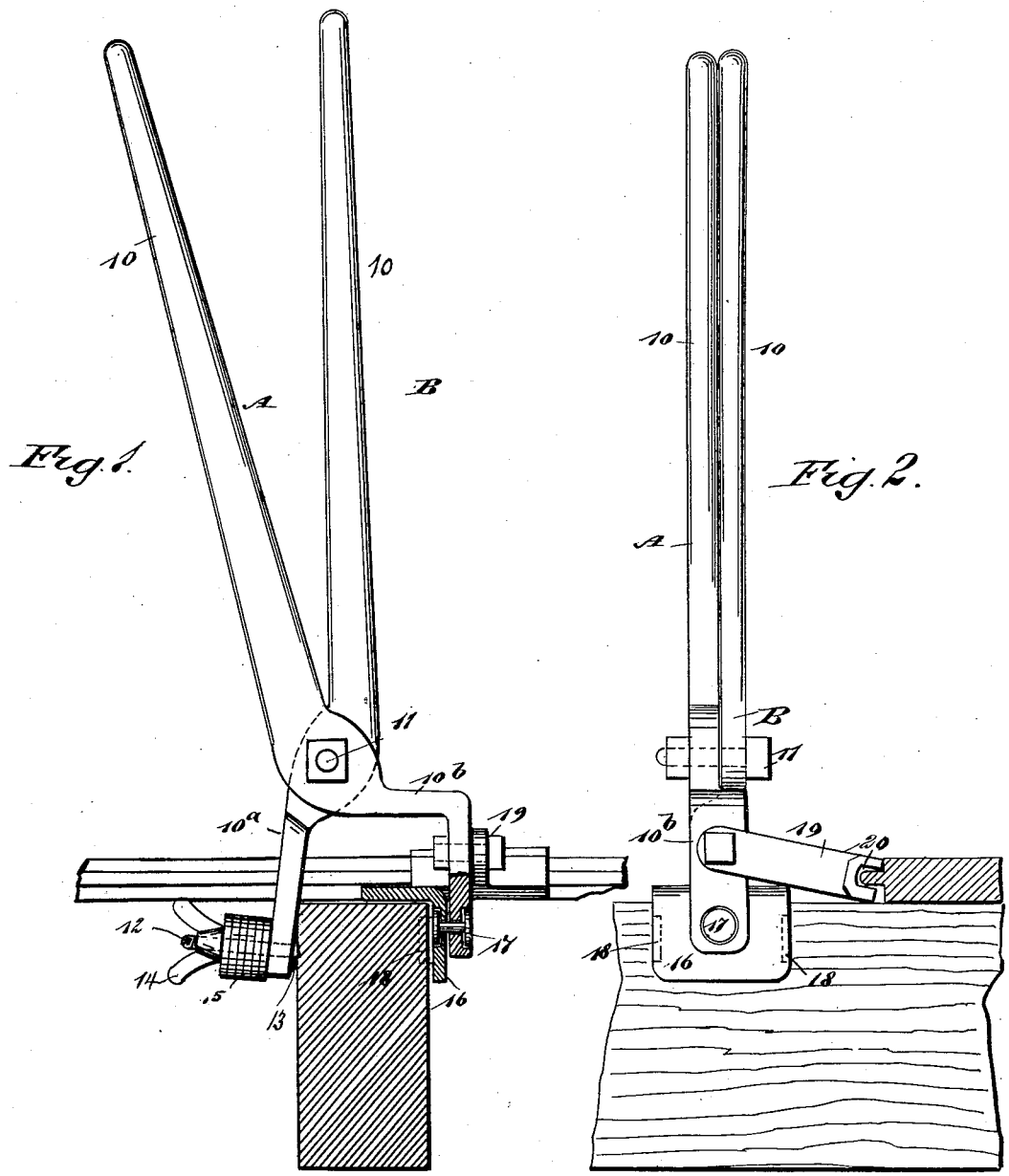

EDWARD AUGUSTUS BULLOCK, OF BELLEFONTE, PENNSYLVANIA.

FLOOR-JACK.

SPECIFICATION forming part of Letters Patent No. 481,470, dated August 23, 1892.

Application filed March 18, 1892. Serial No. 425,374. (No model.)

*To all whom it may concern:*

Be it known that I, EDWARD AUGUSTUS BULLOCK, of Bellefonte, in the county of Centre and State of Pennsylvania, have invented a new and useful Improvement in Floor-Jacks, of which the following is a full, clear, and exact description.

My invention relates to an improvement in floor-jacks, and has for its object to provide a device of simple, durable, and economic construction, capable of being expeditiously and conveniently manipulated in such a manner as to force the tongue of one floor-board into the groove of the next board and to maintain a perfect impact between the two boards while the last board laid is nailed to place.

Another object of the invention is to provide an implement capable of being readily shifted from joist to joist, and the grip portion of which can be adjusted to fit properly to joists of varying thickness.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a side elevation of the device, partly in section, illustrating said device in working position; and Fig. 2 is an edge view of the device, it being in the position shown in Fig. 1.

The device may be said to consist, primarily, of two sections A and B. Each of these sections comprises a handle member 10 and shank members, designated, respectively, as $10^a$ and $10^b$. At the junction of the handle members with the shank members the sections A and B are pivotally connected by means of a bolt 11 or the equivalent thereof. In this manner by the manipulation of the handle members of the sections the shank members may be brought toward or carried away from each other. The shank members are not of the same shape. The shank member $10^a$ is practically straight—that is to say, it extends from the handle member 10 of the section B at but a slight angle. The shank member $10^b$ of the section A, however, is angular, and consists of an upper horizontal bar extending outward at right angles to the handle member and a vertical bar extending downward in front of the shank $10^a$ and located at right angles to the upper horizontal bar. Thus between the two shanks there is more or less of a rectangular opening. An adjusting-screw 12 is passed through the lower end of the shank $10^a$ of the section B. The inner end of this adjusting-screw is quite sharp, being pointed, as shown at 13 in Fig. 1, and the pointed end of the adjusting-screw is shaped somewhat as a head, being preferably much larger than the body portion thereof.

A lock-nut 14, preferably of the wing pattern, is screwed upon the outer end of the adjusting-screw, and the screw carries, also, between its head or pointed end and the lock-nut a series of washers 15. The washers are intended to adjust the shanks $10^a$ and $10^b$, which may properly be termed "jaws," to receive joists of different thickness. If the jaws or shanks are to be carried far apart, a suitable number of the washers will be located between the lock-nut 14 and the outer face of the jaw or shank $10^a$; but if the joist be narrower the burden of the washers will be placed between the head of the adjusting-screw and the inner face of the jaw or shank. An angular clamping-plate 16 has a swivel connection 17 with the inner face of the vertical portion of the shank or jaw $10^b$, and this clamping-plate in operation is adapted to extend over the top of the joist and down one side. The said clamping-plate is provided with a series of teeth 18, adapted to enter the joist and hold the plate in firm engagement therewith. A shoe 19 is likewise carried by the angular jaw or shank $10^b$. This shoe is somewhat T-shaped in general contour and is pivoted at the end of its shank upon the outer face of the vertical or lower portion of the angular jaw or shank, as is best shown in Fig. 2, and in the head of the shoe a groove 20 is produced, adapted to receive the tongue of the floor-board to be placed in engagement with another board, as is likewise shown in Fig. 2.

In operation, the jaws having been adjusted sufficiently far apart to receive the joists upon which the flooring is to be laid, when a loose board is to be forced up to a proper engagement with a board already laid, for instance, the jaws or shanks of the device are opened sufficiently wide to permit the pointed head of the adjusting-screw to engage with one side of the joist and the clamping-plate 16 to engage with the top and opposite side, as shown in Fig. 1. While this adjustment is being made the shoe is so guided that its groove will receive the tongue of the board to be operated upon—that is to say, when the handles of the device are in an upright position, as shown in Fig. 2, the shoe will be in engagement with the board. This is the first position of the device.

By closing the handles together the joist is effectually and firmly clamped between the jaws and the device may be rocked forward in direction of the board to be pressed, the adjusting-screw acting as one fulcrum and the swivel connection between the jaw and the clamping-plate as the other fulcrum. These parts remain in engagement with the joist, and the farther the handles are carried over in direction of the board to be operated upon the closer will be the contact made between that board and the board against which it is to be laid. When the boards have been brought up properly, the nails may be driven down through its tongue and the device removed to the next joist, where the operation is repeated.

It will be observed that this device is exceedingly simple and durable, as heretofore stated, and that one person may manipulate the device, nailing to place the board that has been operated upon.

Having thus described my invention, I claim as new and desire to secure by Letters Patent—

1. A floor-jack consisting of two sections pivotally connected, said sections comprising handles and jaws, the jaw of one section being practically straight and the jaw of the other section angular, an adjusting-pin carried by one of the jaws, a clamping-plate having a swivel connection with the opposite jaw, and a shoe pivotally connected with one of the jaws and adapted for engagement with the board to be operated upon, as and for the purpose set forth.

2. In a floor-jack, the combination, with a body comprising two pivotally-connected sections, each section consisting of a handle and an attached jaw, one jaw being practically straight and the other angular, whereby an essentially-rectangular opening is formed between them, of an adjusting-screw having a pointed inner end passed through the straight jaw and provided with a series of spacing-washers, an angled clamping-plate having a swivel connection with the angular jaw, and a shoe pivotally connected with the said angular jaw, the shoe being adapted to receive the board to be operated upon, as and for the purpose specified.

3. In a floor-jack, the combination, with two sections pivotally connected, each of said sections comprising a handle and a jaw, the jaw of one section being practically straight and that of the other section angular, of an adjusting-screw passed through the straight jaw, the inner end of which screw is formed as a head and is pointed, spacing-washers carried by the adjusting-screw, an angled plate having a swivel connection with the inner face of the angular jaw, said plate being provided with teeth, and a shoe comprising a shank and a head, the shank being pivotally connected with the angular jaw and the head being provided with a groove to receive the tongue of the board, substantially as and for the purpose specified.

EDWARD AUGUSTUS BULLOCK.

Witnesses:
CLEMENT DALE,
W. H. MUSSER.